US011055537B2

(12) United States Patent
Torabi et al.

(10) Patent No.: US 11,055,537 B2
(45) Date of Patent: Jul. 6, 2021

(54) SYSTEMS AND METHODS FOR DETERMINING ACTIONS DEPICTED IN MEDIA CONTENTS BASED ON ATTENTION WEIGHTS OF MEDIA CONTENT FRAMES

(71) Applicant: Disney Enterprises, Inc., Burbank, CA (US)

(72) Inventors: Atousa Torabi, Pittsburgh, PA (US); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 792 days.

(21) Appl. No.: 15/202,471

(22) Filed: Jul. 5, 2016

(65) Prior Publication Data

US 2017/0308754 A1   Oct. 26, 2017

Related U.S. Application Data

(60) Provisional application No. 62/327,951, filed on Apr. 26, 2016.

(51) Int. Cl.
*G06K 9/00* (2006.01)
*G06K 9/46* (2006.01)
(Continued)

(52) U.S. Cl.
CPC ..... *G06K 9/00751* (2013.01); *G06K 9/00335* (2013.01); *G06K 9/00671* (2013.01);
(Continued)

(58) Field of Classification Search
CPC ........... G06K 9/00744; G06K 9/00758; G06K 9/00765; G06K 9/3241; G06T 7/0016;
(Continued)

(56) References Cited

U.S. PATENT DOCUMENTS

2003/0133022 A1*  7/2003  Melton ................ G11B 27/034
                                                    348/231.2
2012/0123978 A1*  5/2012  Toderice ........... G06F 17/30799
                                                    706/12
(Continued)

OTHER PUBLICATIONS

Jiang, Yu-Gang, et al. *Exploiting Feature and Class Relationships in Video Categorization with Regularized Deep Neural Networks*, IEEE Transactions on Pattern Analysis and Machine Intelligence, Feb. 2015. pp. 1-22.

(Continued)

*Primary Examiner* — Thai Q Tran
(74) *Attorney, Agent, or Firm* — Farjami & Farjami LLP

(57) ABSTRACT

There is provided a system comprising a label database including a plurality of label, a non-transitory memory storing an executable code, and a hardware processor executing the executable code to receive a media content including a plurality of segments, each segment including a plurality of frames, extract a first plurality of features from a segment, extract a second plurality of features from each frame of the segment, determine an attention weight for each frame of the segment based on the first plurality of features extracted from the segment and the second plurality of features extracted from the segment, and determine that the segment depicts one of the plurality of labels in a label database based on the first plurality of features, the second plurality of features, and the attention weight of each frame of the plurality of frames of the segment.

20 Claims, 4 Drawing Sheets

(51) Int. Cl.
   *G11B 27/10* (2006.01)
   *H04L 29/06* (2006.01)
   *G06T 7/62* (2017.01)
   *G06T 7/90* (2017.01)
   *G06N 3/04* (2006.01)
   *G06N 3/08* (2006.01)

(52) U.S. Cl.
   CPC ..... *G06K 9/00718* (2013.01); *G06K 9/00744* (2013.01); *G06K 9/4628* (2013.01); *G06T 7/62* (2017.01); *G06T 7/90* (2017.01); *G11B 27/102* (2013.01); *H04L 65/4069* (2013.01); *G06K 2009/00738* (2013.01); *G06K 2209/21* (2013.01); *G06N 3/0445* (2013.01); *G06N 3/0454* (2013.01); *G06N 3/084* (2013.01); *G06T 2207/10016* (2013.01); *G06T 2207/10024* (2013.01); *G06T 2207/20081* (2013.01); *G06T 2207/20084* (2013.01)

(58) Field of Classification Search
   CPC ...... G06T 2207/10016; G06T 2210/12; G06N 3/08
   USPC .......................................... 706/16; 348/231.2
   See application file for complete search history.

(56) References Cited

U.S. PATENT DOCUMENTS

2017/0255832 A1    9/2017   Jones
2017/0262996 A1*   9/2017   Jain ...................... G06T 7/0087

OTHER PUBLICATIONS

Somboon Hongeng, et al., "Video-based Event Recognition: Activity Representation and Probabilistic Methods," *Computer Vision and Image Understanding* 96 (2004) 129-162, Elsevier, Web, Aug. 13, 2004, pp. 129-162.

* cited by examiner

SYSTEMS AND METHODS FOR DETERMINING ACTIONS DEPICTED IN MEDIA CONTENTS BASED ON ATTENTION WEIGHTS OF MEDIA CONTENT FRAMES

RELATED APPLICATION(S)

The present application claims the benefit of and priority to a U.S. Provisional Patent Application Ser. No. 62/327,951, filed Apr. 26, 2016, which is hereby incorporated by reference in its entirety into the present application.

BACKGROUND

Conventional action recognition in videos relies on manual annotations of the video frames and/or trained motion tracking, and may be combined with object recognition methods. The dramatic increase in video content, such as amateur videos posted on the Internet, has led to a large number of videos that are not annotated for activity recognition, and may include footage and perspective shifts that make conventional action recognition programs ineffective. Additionally, scene changes, commercial interruptions, and other shifts the video content may make identification of activities in a video difficult using conventional methods.

SUMMARY

The present disclosure is directed to systems and methods for determining actions depicted in media contents based on attention weights of media content frames, substantially as shown in and/or described in connection with at least one of the figures, as set forth more completely in the claims.

BRIEF DESCRIPTION OF THE DRAWINGS

FIG. 6 shows a flowchart illustrating an exemplary method of determining actions depicted in media contents based on attention weights of media content frames, according to one implementation of the present disclosure.

DETAILED DESCRIPTION

Figure 1:
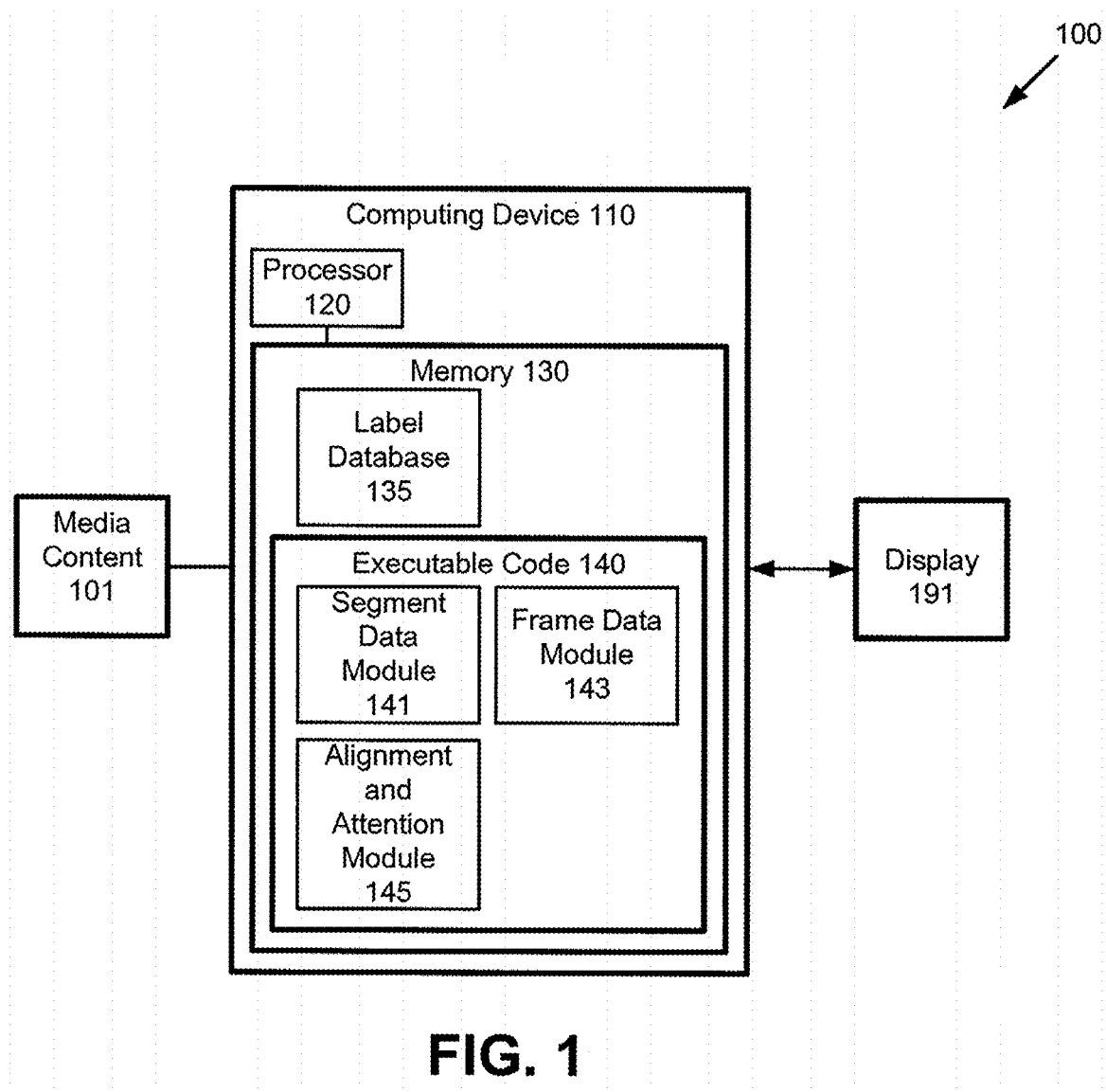
FIG. 1 shows a diagram of an exemplary system for determining actions depicted in media contents based on attention weights of media content frames, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for determining actions depicted in media contents based on attention weights of media content frames, according to one implementation of the present disclosure. System 100 includes media content 101, computing device 110, and display 191. Media content 101 may be a visual media content, an audio media content, a media content including both audio and video, etc. In one implementation, media content 101 may be a media content including a video content having a plurality of segments made up of a plurality of frames, such as a television show, a movie, etc. In one implementation, media content 101 may include audio content having a plurality of segments including a plurality of audio frames.

Computing device 110 includes processor 120 and memory 130. Processor 120 is a hardware processor, such as a central processing unit (CPU), used in computing device 110. Memory 130 is a non-transitory storage device for storing computer code for execution by processor 120, and also for storing various data and parameters. Memory 130 includes label database 135 and executable code 140. Label database 135 may be a database storing a plurality of labels, segment data used to identify each of the plurality of labels, frame data used to identify the plurality of labels, etc. Label database 135 may include a plurality of action labels and data used to identify a plurality of actions corresponding to each of the plurality of action labels. In some implementations, segment data may be temporal data, such as data related to movement of an object through a plurality of frames, and frame data may be spatial data, such as data describing one or more objects related to labels stored in label database 135.

Executable code 140 includes one or more software modules for execution by processor 120 of user device 110. In some implementations, executable code 140 may attend to parts of media content 101. Executable code 140 may use attention alignment to discern parts of media content 101 that are more important and informative for recognition of an activity in media content 101. In some implementations, activity recognition may be defined as sequential problem where inputs are video features, $v_t$, over time. Based on the video feature inputs, executable code 140 may predict a label, $\langle v_1, v_2 \ldots, v_t \rangle \rightarrow y$, from label database 135. Executable code 140 may be configured as an encoder-decoder framework, where input video features of media content 101 are encoded using Convolutional Neural Network (CNN) models and label prediction is done using Long Short-Term Memory (LSTM) as a decoder. In some implementations, executable code 140 may use Very Deep Convolutional Networks for Large-Scale Visual Recognition from the University of Oxford's Visual Geometry Group (VGG). As shown in FIG. 1, executable code 140 includes segment data module 141, frame data module 143, alignment and attention module 145, and attention module 147.

Segment data module 141 is a software module stored in memory 130 for execution by processor 120 to extract segment data from a video segment of media content 101. In some implementations, video segments may be fixed-length video segments having a fixed number of frames in each segment. Segment data module 141 may extract a plurality of video features using a spatio-temporal Convolutional Neural Network (CNN).

Frame data module 143 is a software module stored in memory 130 for execution by processor 120 to extract frame data from each frame in a video segment of media content 101. Frame data module 143 may extract frame data from each frame of the segment of media content 101 using a spatial CNN. In some implementations, frame data module 143 may be trained to extract frame data for object recognition, action recognition, scene recognition, etc.

Alignment and attention module 145 is a software module stored in memory 130 for execution by processor 120 to align actions depicted in media content 101 with frame data extracted by frame data module 143 and determine an attention weight for each frame in the segment of media content 101. Alignment and attention module 145 may be a feedforward neural network that may generate a matching score for each frame from which frame data module 143 extracted frame data at a defined time interval t. The matching score may represent how well a sequentially modeled activity video up to time t−1 and the frame at time t are semantically matched. In some implementations, alignment and attention module 145 may determine the attention weight for each frame of the segment of media content 101 based on the matching score. Alignment and attention module 145 may compute attention weights for the frames of the segment by normalizing the matching scores using a normalized exponential function, such as a softmax function.

FIGS. 2a-2f show a plurality of images each depicting part of a scene. In some implementations, each image may be a part of an input media content, such as media content 101. FIGS. 2a-2f show a visualization of the output of executable code 140, with columns 201a-201f showing a visualization of the frames to which executable code 140 may assign the highest attention weight and columns 202a-202f showing a visualization of the frames to which executable code 140 may assign the lowest attention weight.

Figure 2A:
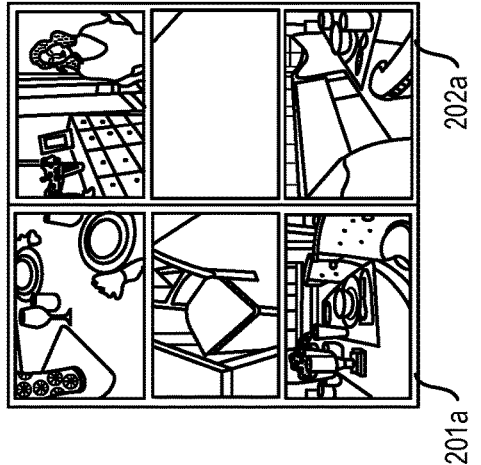
FIG. 2a shows a plurality of exemplary frames of media contents that are analyzed using the system of FIG. 1, according to one implementation of the present disclosure.

FIG. 2a shows a plurality of exemplary frames of media contents that are analyzed using the system of FIG. 1, according to one implementation of the present disclosure. Frames included in FIG. 2a depict the action of setting a table. Column 201a shows three (3) examples of video frames receiving the highest attention weights, and column 202a shows three (3) examples of video frames receiving the lowest attention weights. For these examples, frame data are extracted from $VGG_{obj}$. Images containing table, chair, cup, dish, glass, candle and napkin receive maximum attention weights, and images showing a couch, a zoomed image, and an image of a woman sitting in a bedroom receive minimum attention weights.

Figure 2B:
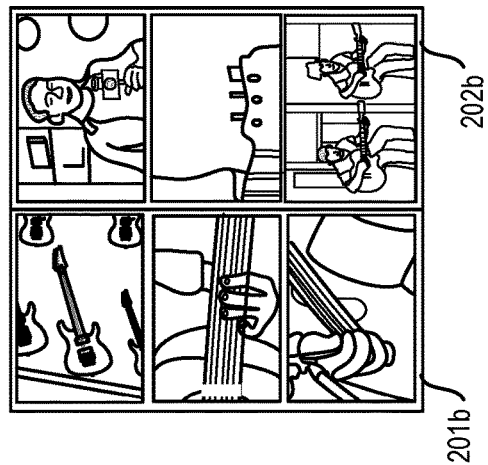
FIG. 2b shows another plurality of exemplary frames of media contents that are analyzed using the system of FIG. 1, according to one implementation of the present disclosure.

FIG. 2b shows another plurality of exemplary frames of media contents that are analyzed using the system of FIG. 1, according to one implementation of the present disclosure. Frames included in FIG. 2b depict the action of playing guitar. Column 201b shows three (3) examples of video frames receiving the highest attention weights, and column 202b shows three (3) examples of video frames receiving the lowest attention weights. For these examples, frame data are extracted from $VGG_{obj}$. Images containing part or all of a guitar receive maximum attention weights, while occluded images and images not depicting a guitar receive minimum attention weights.

Figure 2C:
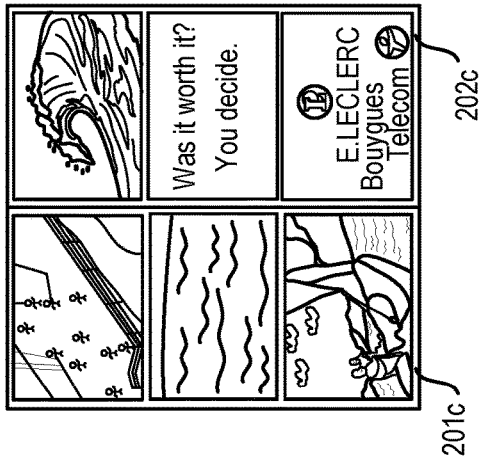
FIG. 2c shows another plurality of exemplary frames of media contents for that are analyzed using the system of FIG. 1, according to one implementation of the present disclosure.

FIG. 2c shows another plurality of exemplary frames of media contents that are analyzed using the system of FIG. 1, according to one implementation of the present disclosure. Frames included in FIG. 2c depict a sailing scene. Column 201c shows three (3) examples of video frames receiving the highest attention weights, and column 202c shows three (3) examples of video frames receiving the lowest attention weights. For these examples, frame data are extracted from $VGG_{sce}$. Images related to the scene including sea, sky and sailing boat receive maximum attention weights, while images that contain no scene salient features related to sailing receive minimum attention weights.

Figure 2D:
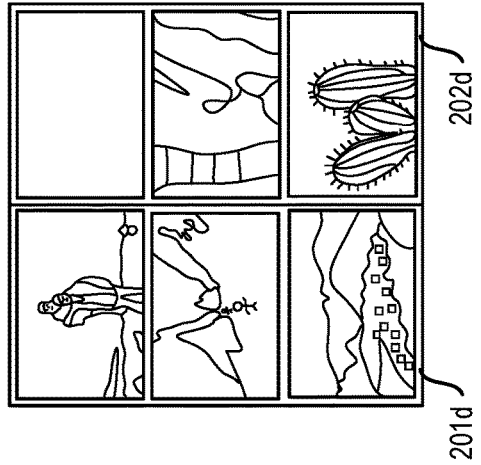
FIG. 2d shows another plurality of exemplary frames of media contents that are analyzed using the system of FIG. 1, according to one implementation of the present disclosure.

FIG. 2d shows another plurality of exemplary frames of media contents that are analyzed using the system of FIG. 1, according to one implementation of the present disclosure. Frames included in FIG. 2d depict a mountain climbing scene. Column 201d shows three (3) examples of video frames receiving the highest attention weights, and column 202d shows three (3) examples of video frames receiving the lowest attention weights. For these examples, frame data are extracted from $VGG_{sce}$. Images scenes showing mountain, climbers, sky, and snow receive maximum attention weights, while close-up images or text with no features related to mountain climbing receive minimum attention weights.

Figure 2E:
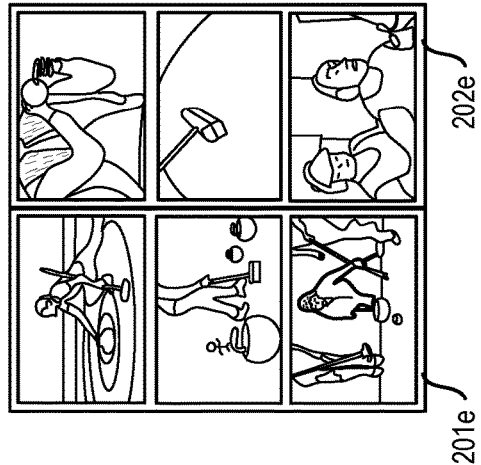
FIG. 2e shows another plurality of exemplary frames of media contents that are analyzed using the system of FIG. 1, according to one implementation of the present disclosure.

FIG. 2e shows another plurality of exemplary frames of media contents that are analyzed using the system of FIG. 1, according to one implementation of the present disclosure. Frames included in FIG. 2e depict curling. Column 201e shows three (3) examples of video frames receiving the highest attention weights, and column 202e shows three (3) examples of video frames receiving the lowest attention weights. For these examples, frame data are extracted from $VGG_{act}$. Images related to curling receive maximum attention weights, while images not related to curling receive minimum attention weights.

Figure 2F:
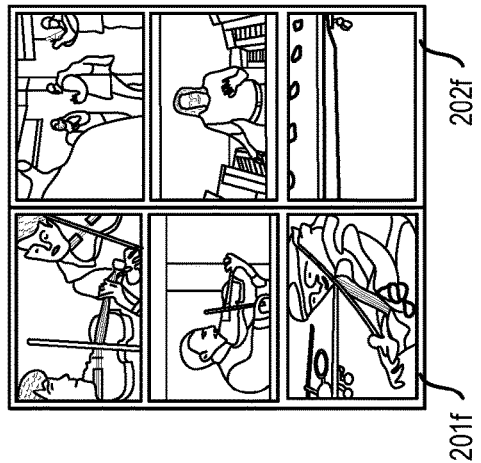
FIG. 2f shows another plurality of exemplary frames of media contents that are analyzed using the system of FIG. 1, according to one implementation of the present disclosure.

FIG. 2f shows another plurality of exemplary frames of media contents that are analyzed using the system of FIG. 1, according to one implementation of the present disclosure. Frames included in FIG. 2f depict playing guitar. Column 201f shows three (3) examples of video frames receiving the highest attention weights, and column 202f shows three (3) examples of video frames receiving the lowest attention weights. For these examples, frame data are extracted from $VGG_{act}$. Images related to playing guitar receive maximum attention weights, while images not related to playing guitar receive minimum attention weights.

Figure 3:
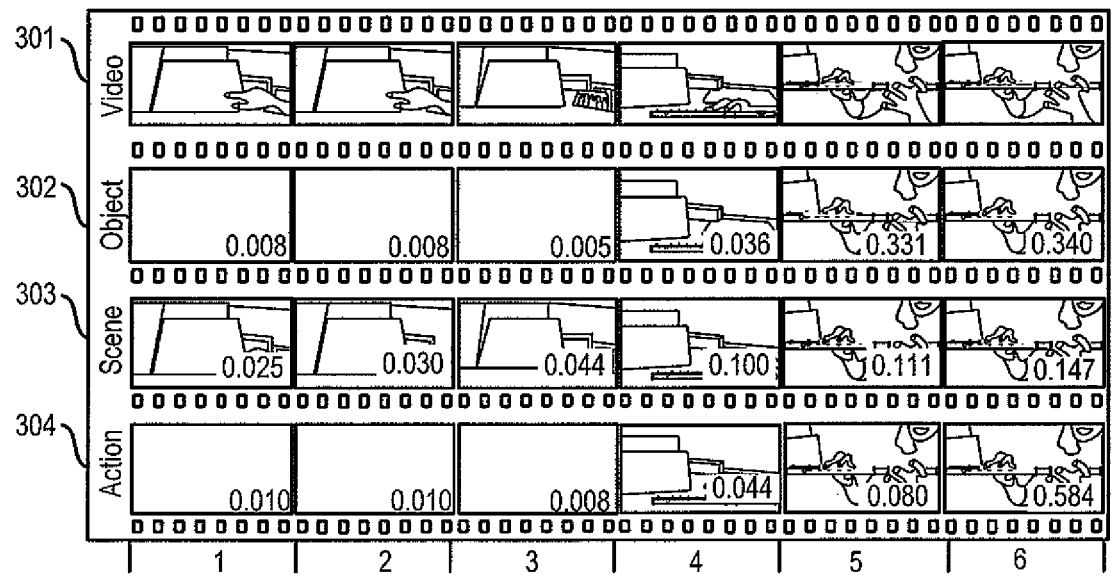
FIG. 3 shows a diagram of exemplary frames of a media content analyzed using the system of FIG. 1, according to one implementation of the present disclosure.

FIG. 3 shows a diagram of a plurality of exemplary frames of a media content analyzed using the system of FIG. 1, according to one implementation of the present disclosure. Row 301 shows six (6) sampled frames of a media content that are passed to frame data module 143, which may be an attention-based LSTM model (aLSTM). Row 301 represents a plurality of input frames media content 101. Rows 302, 303, and 304 depict a visualization of the output of executable code 140. Each row may represent the output of executable code 140 analyzing media content 101 based on a different set of features. The darker frames represent frames having lower attention weights, indicating less significant features, and the brighter images have higher attention weights indicating the frames have more salient aspects related to the corresponding frame data extracted from each frame in the video segment. Row 302 shows the sampled frames weighted for object data related to playing the flute. The first four frames appear nearly black when weighted for object data indicating a very low attention weight, whereas the final two frames are relatively bright indicating a high attention weight. Row 303 shows the sampled frames weighted for scene data related to playing the flute. Each successive frame in row 303 is increasingly bright indicating an increase in attention weight. Row 304 shows the sampled frames weighted for action data related to playing the flute. The first five frames appear nearly black when weighted for action data indicating a very low attention weight, whereas the final frame appears relatively bright indicating a high attention weight.

Figure 4:
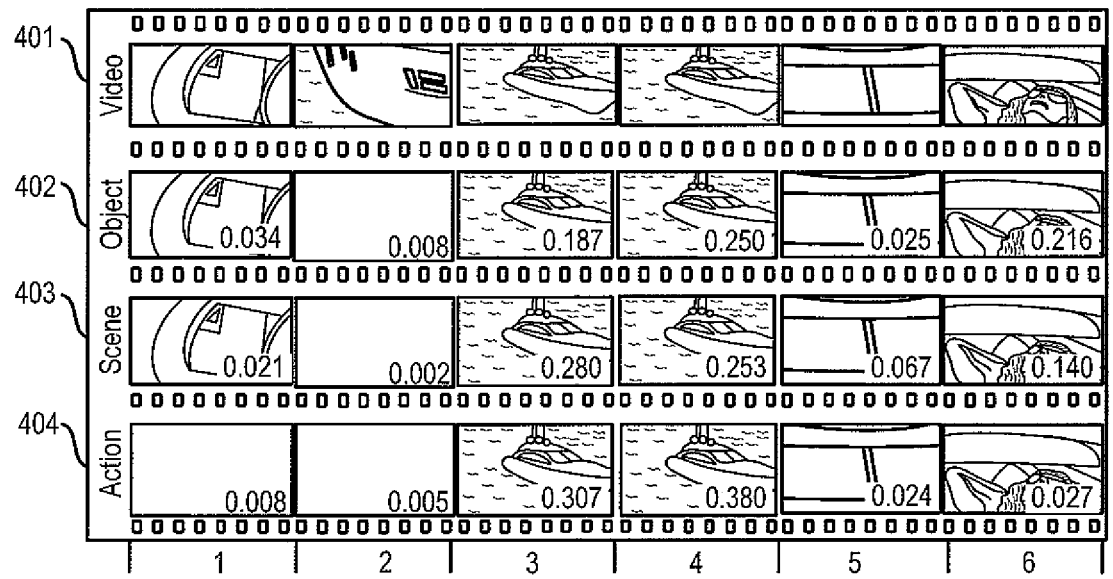
FIG. 4 a shows a diagram of exemplary frames of another media content analyzed using the system of FIG. 1, according to one implementation of the present disclosure.

FIG. 4 shows a diagram of a plurality of exemplary frames of another media content analyzed using the system of FIG. 1, according to one implementation of the present disclosure. Row 401 shows six (6) sampled frames of a media content that are passed to frame data module 143. Row 401 represents a plurality of input frames media content 101. Rows 402, 403, and 404 depict a visualization of the output of executable code 140. Each row may represent the output of executable code 140 analyzing media content 101 based on a different set of features. The darker frames represent frames having lower attention weights, indicating less significant features, and the brighter images have higher attention weights indicating the frames have more salient aspects related to the corresponding frame data extracted from each frame in the video segment. Row 402 shows the sampled frames weighted for object data related to yachting. The frames including boats on the water and an individual sunning in a bathing suit have high attention weights, as indicated by the brightness of the third, fourth, and sixth frame of row 402. Row 403 shows the sampled frames weighted for scene data related to yachting. Frames depicting a boat on the water and an individual sunning in a bathing suit have high attention weighting for scene data related to yachting. Row 404 shows the sampled frames weighted for action data related to yachting. Frames depicting a boat on the water have high attention weight for action data related to yachting, as indicated by the brightness of the third and fourth frame of row 404, whereas the other four frames in row 404 have low attention weight for the action of yachting.

Figure 5:
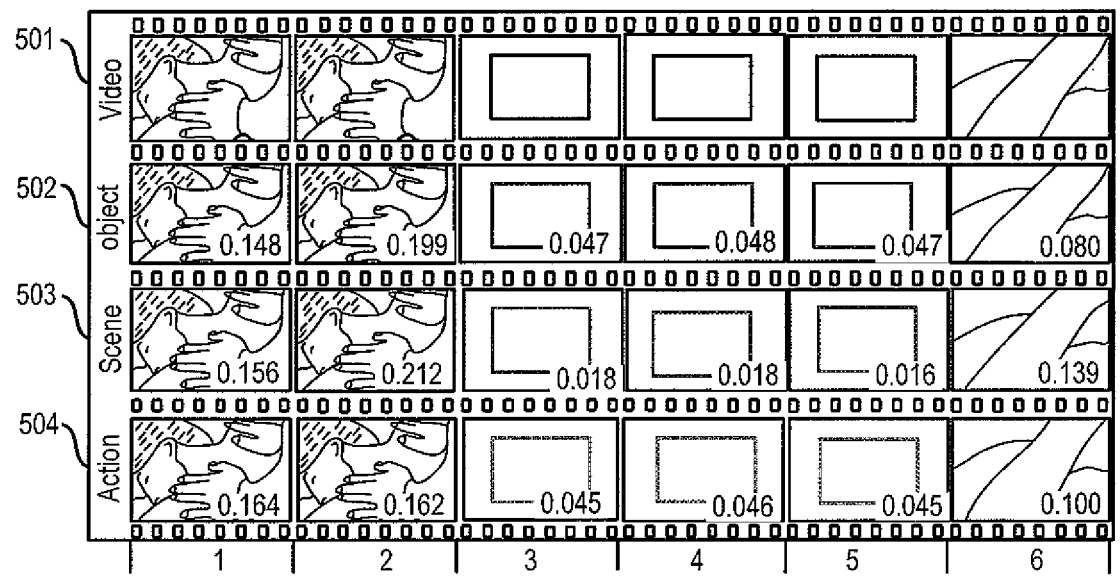
FIG. 5 shows a diagram of exemplary frames of another media content analyzed using the system of FIG. 1, according to one implementation of the present disclosure.

FIG. 5 shows a diagram of a plurality of exemplary frames of another media content analyzed using the system of FIG. 1, according to one implementation of the present disclosure. Row 501 shows six (6) sampled frames of a media content that are passed to frame data module 143. Row 501 represents a plurality of input frames media content 101. Rows 502, 503, and 504 depict a visualization of the output of executable code 140. Each row may represent the output of executable code 140 analyzing media content 101 based on a different set of features. The darker frames represent frames having lower attention weights, indicating less significant features, and the brighter images have higher attention weights indicating the frames have more salient aspects related to the corresponding frame data extracted from each frame in the video segment. Row 502 shows the sampled frames weighted for object data related to getting a massage. The frames including parts of the body of an individual receiving a massage and the hands of the individual receiving the massage have high attention weights, as indicated by the brightness of the first and second frame of row 502. Row 503 shows the sampled frames weighted for scene data related to getting a massage. Frames depicting parts of the body of the individual receiving the massage have high attention weighting for scene data related to getting a massage, while frames that include the large text box have lower attention weight, as indicated by the darkness of the third, fourth, and fifth frames in for 503. Row 504 shows the sampled frames weighted for action data related to getting a massage. Frames depicting part of an individual have high attention weight for action data related to getting a massage, as indicated by the brightness of the first frame, second frame, and sixth frame of row 504, whereas the other three frames in row 504 have low attention weight for the action of getting a massage, primarily resulting from the large text box that fills the frame.

FIG. 6 shows a flowchart illustrating an exemplary method of determining actions depicted in media contents based on attention weights of media content frames, according to one implementation of the present disclosure. In some implementations, executable code 140 may be trained with stochastic gradient descent with momentum of 0.9 and learning rate of 0.01. Training may apply dropout with probability 0.5 to all LSTM non-recurrent connections and fully-connected layers. Training may use a fixed 0.01 learning rate for 2512 iterations on mini-batches of size 200. After that, the learning rate may be decreased every 125 iterations by a fixed ratio. Training may use an early stopping strategy on validation set loss. The dataset may be augmented by adding horizontally-flipped frames to training data. In some implementations, training executable code 140 may include an on-the-fly temporal cropping of training videos, which means that at each iteration, a fixed-size video chunk of 192 frames may be randomly cropped from each video sample in the mini-batch.

Method 600 begins at 610, where executable code 140 receives media content 101 including a plurality of segments, each segment of the plurality of segments including a plurality of frames. Media content 101 may be a television show, a television broadcast, a movie, etc. Method 600 continues at 620, where executable code 140 extracts a first plurality of features from a first or a given segment of the plurality of segments. In some implementations, each segment of media content 101 may be a fixed temporal-length segment of F frames. Segment data module 141 may extract video features from this segment using spatio-temporal CNN implemented in Caffe. As a result, the input segment may be represented using a matrix $$V=\{v_1, \ldots, v_N\} \in R^{N \times d_v} \quad (1)$$

of N video feature vectors, where each vector $v_i \in R^{d_v}$ is a $d_v$-dimensional representation corresponding to a chunk of F/N frames. In some implementations, N may also correspond to the length of the LSTM decoder sequence, such that for every video feature vector, executable code 140 may provide an activity label prediction. For example, executable code 140 may make use of a C3D network pre-trained on Sport-1-million dataset that has been fine-tuned on trimmed ActivityNet videos. C3D network has eight (8) convolutional layers and two (2) fully connected layers, followed by a softmax output layer. All three-dimensional (3D) convolution kernels are 3×3×3 with stride one (1) in both spatial and temporal dimensions. Segment data module 141 may extract a first Fully-Connected layer (FC6) as a feature vector representation, therefore $d_v$=4096.

At 630, executable code 140 extracts a second plurality of features from each frame of the plurality of frames of the first segment. Frame data module 143 may extract frame data using spatial CNN in Caffe. As a result, frame data may be represented using a matrix:

$$A = \{a_1, \ldots, a_T\}, a_i \in R^{T \times d_a} \quad (2)$$

of T video feature vectors where each vector $a_i \in R^{d_v}$ is a $d_a$-dimensional representation corresponding to a single frame. In some implementations, each segment is sampled every F/N video frames, therefore T=N. Frame data module 143 may use a VGG-19 network trained for three tasks of object, action, and scene recognition:
1. $VGG_{obj}$: VGG trained on ImageNet for object recognition of 1000 classes;
2. $VGG_{act}$: VGG-19 network fine-tuned on ActivityNet data for action recognition of 203 action classes; and
3. $VGG_{sce}$: VGG-19 network fine-tuned on MIT-Scenes for scene recognition of 205 scene classes.

VGG-19 may have sixteen (16) convolutional layers and three (3) fully connected layers, followed by a softmax output layer. In some implementations, frame data module 143 may extract a first Fully-Connected layer (FC6), therefore $d_a$=4096. In other implementations, frame data module 143 may extract a last Fully-Connected layer (FC8) as a frame representation. For $VGG_{obj}$ FC8 layer $d_a$=1000, for $VGG_{act}$ FC8 layer $d_a$=203, and for $VGG_{sce}$ FC8 layer $d_a$=205. In general, the size of T could be different from the size of input-data N(T≠N). For example, executable code 140 may attend to objects/scenes/actions at a coarser or finer temporal granularity compared to the granularity of label predictions.

At 640, executable code 140 generates a matching score for each frame of the plurality of frames of the first segment based on each preceding frame in the first segment. Alignment and attention module 145 may be parameterized as a feedforward neural network and may be jointly trained with LSTM decoder, such that the gradients of LSTM loss function are back propagated not only through LSTM network, but also through alignment network that allows joint training of LSTM and soft-alignment networks. Alignment and attention module 145 may determine a score for each attended frame $a_i$ at time step t. This score represents how well a sequentially modeled activity video up to time t−1 and attended $a_i$ are semantically matched. In other words, matching score $m_{t,i}$ reveals the relevance of $a_i$ and LSTM decoder hidden state at time t−1 and is defined as $$m_{t,i} = \Phi(h_{t-1}, a_i) \quad (3)$$

where $h_{t-1}$ is an LSTM decoder hidden state at time t−1 that contains all information related to a temporally modeled video sample up to time step t−1. For alignment model $\Phi$, every state $h_{t-1}$ may be summed with every frame data $a_i$ to obtain matching-vectors. Each matching-vector may be transformed into a single number, matching-score $m_{t,i}$. In some implementations, the alignment model matching-vector dimension may be one of the network parameters and may have different value than the LSTM hidden-state.

At 650, executable code 140 determines an attention weight for each frame of the plurality of frames of the first segment based on the first plurality of features extracted from the first segment and the second plurality of features extracted from each frame of the plurality of frames of the first segment. In some implementations, alignment and attention module 145 may compute attention weights for each frame of the segment by normalizing matching-scores in a softmax-like function. Attention weight $w_{t,i}$ for attended frame i at time t may be computed by:

$$w_{t,i} = \frac{\exp(m_{t,i})}{\sum_{j=1}^{T} \exp(m_{t,j})} \quad (4)$$

Soft-alignment between a label and the attended frames are defined based on attention weights. A higher attention weight reflects more saliency attributed to a specific attended frame i with respect to the specific action classification. In order to integrate frame data with LSTM decoder, alignment and attention module 145 may compute a weighted average of the frame data, referred to as action attention context, using the attention weights determined above.

$$k_t(A) = \sum_{i=1}^{T} w_{t,i} a_i \quad (5)$$

At 660, executable code 140 determines that the first segment depicts content including one of the plurality of labels in label database 135 based on the first plurality of features, the second plurality of features, and the attention weight of each frame of the plurality of frames of the first segment. In some implementations, aLSTM decoder $\psi$ may sequentially update LSTM state $h_t$ and internal memory $c_t$ given previous state $h_{t-1}$, current input-data $v_t$, and action attention context vector $k_t(A)$. aLSTM decoder $\psi$ may also predict label $y_t$ at time t. aLSTM decoder $\psi$ may be defined as:

$$\begin{bmatrix} h_t \\ y_t \\ c_t \end{bmatrix} = \psi(h_{t-1}, v_t, k_t(A)) \quad (6)$$

In order to fuse input-data and frame data, the information from action attention context may be distributed across the input-data $v_t$. In some implementations, $h_t$ may be updated by the following intermediate functions:

$$i_t = \sigma(W_i v_t + U_i h_{t-1} + b_i) \quad (7)$$

$$f_t = \sigma(W_f v_t + U_f h_{t-1} + b_f) \quad (8)$$

$$o_t = \sigma(W_o v_t + U_o h_{t-1} + b_o) \quad (9)$$

$$g_t = \tan h(W_c v_t + U_c h_{t-1} + b_c) \quad (10)$$

$$c_t = f_t c_{t-1} + i_t g_t \quad (11)$$

$$h_t = o_t \tan h(c_t) \quad (12)$$

where $i_t$, $f_t$, $o_t$, and $c_t$ are respectively input gate, forget gate, output gate, and cell gate (i.e., internal memory) at time t. In brief $i_t$, $f_t$, and $o_t$ control the influence of current input $g_t$ and previous memory state $c_{t-1}$ on generating new hidden state $h_t$. The prediction $y_t$ may be computed by linear transform on hidden state $h_t$ followed by a softmax:

$$y_t = \text{softmax}(W_y h_t + b_y) \quad (13)$$

where $y_t \in R^C$ is probability distribution over fixed number of C classes.

At 670, executable code 140 tags first segment of the plurality of segments with an activity label based on the determined label of a first or a given frame. In some implementations, the activity label may be inserted into media content 101 as metadata, using a metadata container, etc. Method 600 continues at 680, where executable code 140 transmits the first segment to display 191 for display. In some implementations, executable code 140 may transmit the first segment over a network, such as a local network or over the Internet.

At 690, executable code 140 performs an act based on a user input and the label. In some implementations, executable code 140 may begin playing skip a segment of media content 101 based on the user input if the plurality of frames in the segment have or do not have a particular tag. For example, if a user is watching a previously recorded tennis match, the user may provide an input to skip over a segment included that does not show players playing tennis, such as commentary between matches and/or a break to show advertisements. Frames depicting the tennis match may include a tennis tag, whereas the commentary and the advertisements do not. When the user reaches the end of one tennis match, the user may provide an input to forward playback of media content 101 to the next tennis match, and executable code 140 may skip one or more segments of media content 101 that do not include the tennis tag. In other implementations, a user may provide an input to record segments of media content 101 that include a particular tag. For example, the user may want to record a golf tournament to watch at a later time. The user may provide an input instructing executable code 140 to record segments tagged golf. In response to the user input, executable code 140 may record portions of a golf broadcast the show players playing golf, and not record segments of commentary, advertisements, etc.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a label database including a plurality of labels;
a non-transitory memory storing an executable code; and
a hardware processor executing the executable code to:
receive a media content including a plurality of segments, each segment of the plurality of segments including a plurality of frames;
extract segment data from a segment of the plurality of segments;
extract frame data from each frame of the plurality of frames of the segment;
determine an object attention weight, a scene attention weight, and an action attention weight for each frame of the plurality of frames of the segment based on the segment data extracted from the segment and the frame data extracted from each frame of the plurality of frames of the segment;
determine that the segment depicts a label of the plurality of labels in the label database based on the segment data, the frame data, the object attention weight, the scene attention weight, and the action attention weight of each frame of the plurality of frames of the segment;
tag the segment with the label;
receive a user input from a user device; and
perform an act on the media content based on the user input and the label.

2. The system of claim 1, wherein, prior to determining the object attention weight, the scene attention weight, and the action attention weight for each frame of the plurality of frames of the segment, the hardware processor further executes the executable code to:
generate a matching score for each frame of the plurality of frames of the segment based on each preceding frame in the segment.

3. The system of claim 1, wherein the frame data extracted from each frame of the plurality of frames of the segment includes at least scene data, object data, and activity data.

4. The system of claim 1, wherein the object attention weight, the scene attention weight, and the action attention weight for each frame of the plurality of frames of the segment is based on at least one of a complementary scene data source, a complementary object data source, and a complementary activity data source.

5. The system of claim 1, wherein the segment data includes temporal data and the frame data includes spatial data.

6. The system of claim 1, wherein each frame of the plurality of frames in the segment is considered in determining that the label of the plurality of labels in the label database is included in the frame in proportion to the object attention weight, the scene attention weight, and the action attention weight.

7. The system of claim 1, wherein the object attention weight, the scene attention weight, and the action attention weight of a frame of the plurality of frames of the segment is based on at least one of the object attention weight, the scene attention weight, and the action attention weight of one or more frames preceding the frame in the segment and the object attention weight, the scene attention weight, and the action attention weight of one or more frames succeeding the frame in the segment.

8. The system of claim 1, wherein the hardware processor further executes the executable code to:
transmit the segment to a display device for display.

9. The system of claim 1, wherein tagging the segment with the label includes inserting the label into the media content using a metadata container.

10. The system of claim 1, wherein performing the act based on the user input and the label includes one of skipping the segment and recording the segment.

11. A method for use with a system including a non-transitory memory and a hardware processor, the method comprising:
receiving, using the hardware processor, a media content including a plurality of segments, each segment of the plurality of segments including a plurality of frames;
extracting, using the hardware processor, segment data from a segment of the plurality of segments;
extracting, using the hardware processor, frame data from each frame of the plurality of frames of the segment;
determining, using the hardware processor, an object attention weight, a scene attention weight, and an action attention weight for each frame of the plurality of frames of the segment based on the segment data extracted from the segment and the frame data extracted from each frame of the plurality of frames of the segment;

determining, using the hardware processor, that the segment depicts a label of the plurality of labels in the label database based on the segment data, the frame data, the object attention weight, a scene attention weight, and an action attention weight of each frame of the plurality of frames of the segment;

tagging, using the hardware processor, the segment with the label;

receiving, using the hardware processor, a user input from a user device; and performing, using the hardware processor, an act on the media content based on the user input and the label.

12. The method of claim 11, wherein, prior to determining the object attention weight, the scene attention weight, and the action attention weight for each frame of the plurality of frames of the segment, the method further comprises:

generating, using the hardware processor, a matching score for each frame of the plurality of frames of the segment based on each preceding frame in the segment.

13. The method of claim 11, wherein the frame data extracted from each frame of the plurality of frames of the segment includes at least scene data, object data, and activity data.

14. The method of claim 11, wherein the object attention weight, the scene attention weight, and the action attention weight for each frame of the plurality of frames of the segment is based on at least one of a complementary scene data source, a complementary object data source, and a complementary activity data source.

15. The method of claim 11, wherein the segment data includes temporal data and the frame data includes spatial data.

16. The method of claim 11, wherein each frame of the plurality of frames in the segment is considered in determining that the label of the plurality of labels in the label database is included in the frame in proportion to the object attention weight, the scene attention weight, and the action attention weight.

17. The method of claim 11, wherein the object attention weight, the scene attention weight, and the action attention weight of a frame of the plurality of frames of the segment is based on at least one of the object attention weight, the scene attention weight, and the action attention weight of one or more frames preceding the frame in the segment and the object attention weight, the scene attention weight, and the action attention weight of one or more frames succeeding the frame in the segment.

18. The method of claim 11, further comprising:

transmitting, using the hardware processor, the segment to a display device for display.

19. The method of claim 11, wherein the tagging of the segment with the label includes inserting the label into the media content using a metadata container.

20. The method of claim 11, wherein the performing of the act based on the user input and the label includes one of skipping the segment and recording the segment.

\* \* \* \* \*